United States Patent
Reed et al.

(10) Patent No.: US 9,276,521 B2
(45) Date of Patent: Mar. 1, 2016

(54) CLAMP FOR SOLAR PANEL ARRAY

(71) Applicant: JSI Equipment solutions LLC, Boulder, CO (US)

(72) Inventors: Max W. Reed, Longmont, CO (US); Brian D. Kirtland, Boulder, CO (US); Michael T. Bozeman, Arvada, CO (US)

(73) Assignee: JSI Equipment Solutions LLC, Boulder, CO (US)

( * ) Notice: Subject to any disclaimer, the term of this patent is extended or adjusted under 35 U.S.C. 154(b) by 161 days.

(21) Appl. No.: 14/157,084

(22) Filed: Jan. 16, 2014

(65) Prior Publication Data

US 2015/0200621 A1 Jul. 16, 2015

(51) Int. Cl.
*E04D 13/18* (2014.01)
*H02S 20/20* (2014.01)
*F24J 2/52* (2006.01)

(52) U.S. Cl.
CPC . *H02S 20/32* (2014.12); *F24J 2/52* (2013.01); *H02S 20/20* (2014.12)

(58) Field of Classification Search
USPC ............. 248/237, 218.4, 219.1, 219.2, 219.3, 248/219.4, 230.1, 230.8, 230.5; 136/244, 136/251; 52/173.3
See application file for complete search history.

(56) References Cited

U.S. PATENT DOCUMENTS

| | | | |
|---|---|---|---|
| 7,345,134 B2 | 3/2008 | Jin | |
| 7,647,924 B2 | 1/2010 | Hayden | |
| 7,763,835 B2 | 7/2010 | Romeo | |
| 7,780,472 B2 | 8/2010 | Lenox | |
| 8,092,129 B2 | 1/2012 | Wiley et al. | |
| 8,152,575 B2 | 4/2012 | Boling et al. | |
| 8,303,357 B2 | 11/2012 | Kuwahara et al. | |
| 8,650,827 B2 * | 2/2014 | Givoni et al. | 52/588.1 |
| 8,661,747 B2 * | 3/2014 | Eide | 52/173.3 |
| 8,745,935 B2 * | 6/2014 | Dupont et al. | 52/173.3 |
| 8,925,263 B2 * | 1/2015 | Haddock et al. | 52/173.3 |
| 2008/0053517 A1 | 3/2008 | Plaisted et al. | |
| 2008/0250614 A1 | 10/2008 | Zante | |
| 2009/0166494 A1 * | 7/2009 | Bartelt-Muszynski et al. | 248/237 |
| 2011/0265860 A1 | 11/2011 | Clasulli et al. | |
| 2012/0097816 A1 | 4/2012 | Tamm et al. | |
| 2012/0180845 A1 | 7/2012 | Cole et al. | |
| 2012/0222718 A1 | 9/2012 | Sweeney | |
| 2012/0244729 A1 | 9/2012 | Rivera et al. | |

* cited by examiner

*Primary Examiner* — Steven Marsh
(74) *Attorney, Agent, or Firm* — Bracewell & Giuliani LLP

(57) ABSTRACT

A clamp for securing photovoltaic panels to a support tube of a photovoltaic panel array has a lower brace for positioning on the support tube perpendicular to the support tube. The lower brace has a central web with a pair of side walls depending from opposite edges of the web. Support shoulders are formed in the side walls. Straps have tabs on an upper end that land on the support shoulders. An upper brace has flanges for engaging upper edge surfaces of adjacent ones of the panels. At least one deflectable standoff positions the upper brace a distance from the lower brace that is selected to be greater than a thickness of the adjacent ones of the panels. Tightening bolts between the braces deflects the standoff and draws the upper brace toward the lower brace to clamp the adjacent ones of the panels between the lower and upper braces.

20 Claims, 7 Drawing Sheets

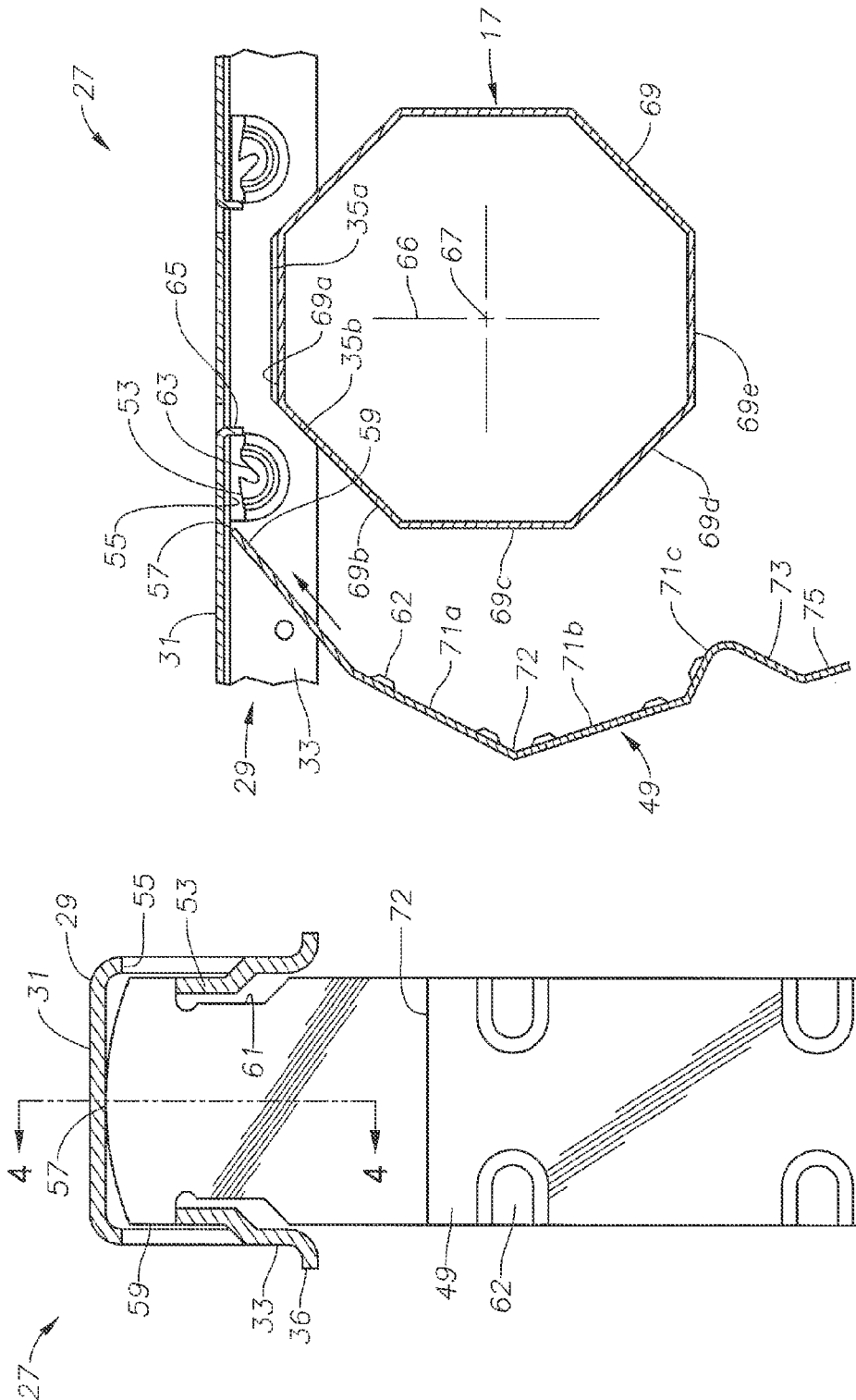

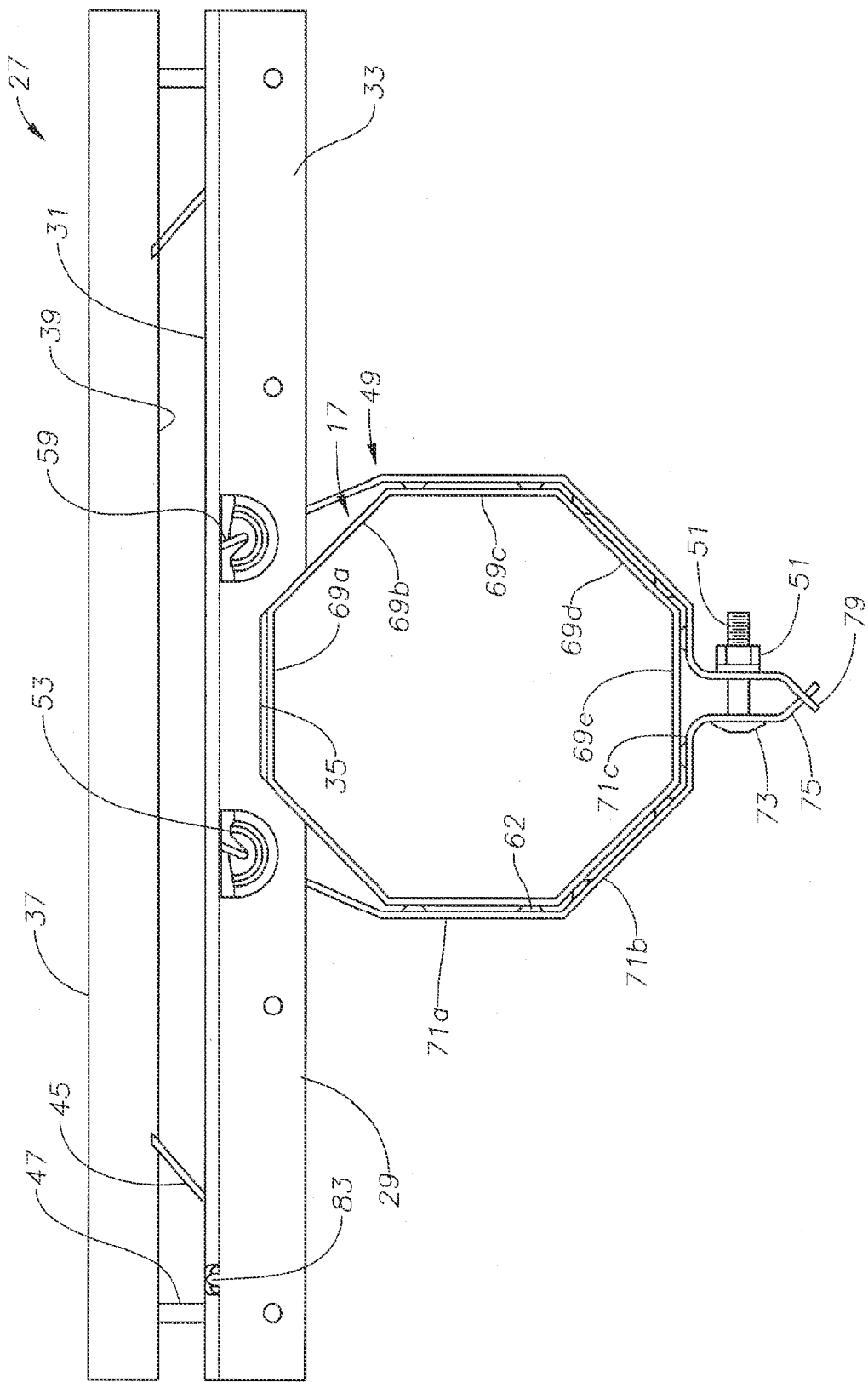

CLAMP FOR SOLAR PANEL ARRAY

FIELD OF THE DISCLOSURE

This invention relates in general to a solar or photovoltaic panel system, and in particular a clamp for clamping the panels to a support tube.

BACKGROUND

Solar or photovoltaic panels may be installed with a tracking system to pivot and track the sun during the day. The solar panels may also be installed with fixed systems, or with systems that allow manual adjustment of the panels with changes in seasons. One type of system has parallel rows of panels, each row extending north and south. The panels are mounted on a torque or support tube. Each row has a separate support tube, which is supported on posts. For tracking systems, a drive shaft extends perpendicular to the support tubes and has mechanical devices that convert movement of the drive shaft into rotation of the support tube. A controller programmed to track the sun operates the drive shaft.

The solar panels are typically mounted side-by-side to the support tube with clamps. Each clamp may have upper and lower braces secured on top of the support tube by a retainer. The retainer, for example, may be two bolts extending downward from the upper brace alongside the support tube and through holes in a flat plate located below the support tube. Nuts secure the bolts to the flat plate, and also tighten the upper brace to the lower brace. Some clamps, particularly those having longer length braces, employ in addition two shorter length bolts at the ends of the braces to tighten ends of the upper brace to the lower brace. The workers need to be careful to assure that the lower brace is perpendicular to the support tube, one installed. Edges of the adjacent solar panels will be positioned on the lower brace. An upper brace will then be placed over the solar panel edges and secured by bolts to the lower brace. Normally, three workers are required to install solar panels on a support tube.

SUMMARY

The clamp of this disclosure has a lower brace for positioning on the support tube perpendicular to the support tube. The lower brace has a central web with a pair of side walls depending from opposite edges of the web. First and second sets of support shoulders are formed in the side walls apart from each other along a length of the lower brace. The support shoulders of each of the sets are opposite each other. First and second straps are in engagement with the first and second sets of support shoulders, respectively. Each of the straps has tabs on an upper end facing in opposite directions. Each of the tabs lands on one of the support shoulders to retain each of the straps with the lower brace. A fastener secures lower ends of the straps to each other.

Preferably, a width of each of the straps between outer edges of the tabs is less than a distance between inner sides of the side walls. Also, each of the support shoulders is located inward from an inner side of one of the side walls.

First and second stop surfaces are adjacent the first and second sets of support shoulders, respectively. Each of the stop surface depends downward from a lower side of the web. Each of the stop surfaces is positioned for contact by the upper end of one of the straps during insertion of the strap into engagement with the support shoulders.

In the preferred embodiment, a plurality of protuberances protrude from each of the straps for contact with the support tube. The lower end of each of the straps includes a planar fastener section having an aperture through which the fastener extends. The fastener section is in a plane normal to the length of the lower brace. An inward inclined section depends from each of the fastener sections. Each of the inclined sections has a lower free end. The lower free ends abut each other and space the fastener sections apart from each other when the fastener is tightened. A lip may depend from the free end. The lip is offset from a centerline between side edges of each of the straps, such that the lips are juxtaposed when the fastener secures the straps.

Preferably, a recess is located in each of the side walls of the lower brace. The recess has two side edges inclining downward in opposite directions to a lower side of the lower brace. The inclined side edges are in flush contact with upper inclined surfaces of the support tube.

The clamp has an upper brace that is parallel to and located above the lower brace. The upper brace has flanges extending in opposite directions from each other along a length of the upper brace for engaging upper edge surfaces of adjacent ones of the panels. At least one deflectable standoff positions the upper brace a distance from the lower brace that is selected to be greater than a thickness of the adjacent ones of the panels. A pair of bolts extend vertically between the upper and lower braces. Tightening the bolts deflects the standoff and draws the upper brace toward the lower brace to clamp the adjacent ones of the panels between the lower and upper braces.

In the preferred embodiment, an electrical ground tooth projects upward from the lower brace. The ground tooth embeds into one of the panels when the upper brace is clamped to the lower brace.

BRIEF DESCRIPTION OF THE DRAWINGS

FIG. 3 is a partial sectional view of a lower brace of the clamp of FIG. 2, taken along the line 3-3 of FIG. 2, and illustrating one of the straps retained by the lower brace.

FIG. 4 is a sectional view of the clamp of FIG. 2, taken along the line 4-4 of FIG. 3 and showing the strap being inserted into the lower brace.

FIG. 8 is an elevational view of the of the clamp of FIG. 2 showing the clamp secured to a support tube of the solar panel system of FIG. 1, but prior to installing the panels.

DETAILED DESCRIPTION OF THE DISCLOSURE

Figure 1:
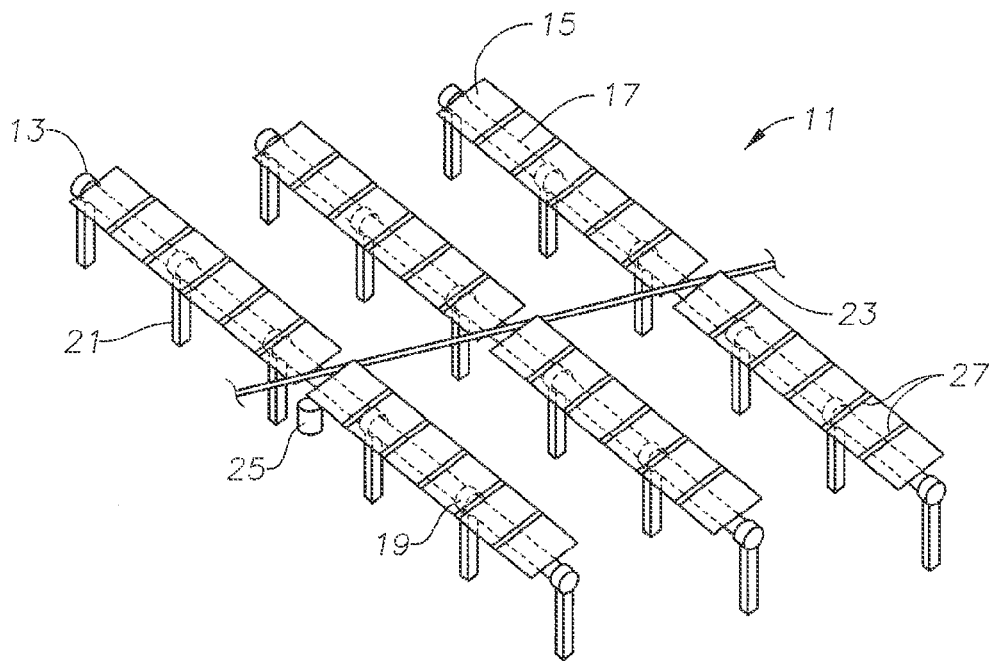
FIG. 1 is a schematic illustration of a photovoltaic panel system having panel clamps in accordance with this disclosure.

Referring to FIG. 1, solar array system 11 is an example of a type having the ability to track the sun during the day. Solar array system 11 has several parallel rows 13 (three shown) aligned in a north-south direction. In each row, solar panels 15, also called photovoltaic panels, are mounted on a torque tube, also referred to herein as a support tube 17, which extends in a north-south direction. Each support tube 17 may extend from one end to the other end of one of the rows 13, or each support tube 17 may have sections coupled together with flexible joints or field-welded to each other. Support tubes 17 may rotate incrementally, causing solar panels 15 to tilt and remain in better exposure to the sun.

Support tubes 17, if rotatable, are mounted by bearings 19 to vertical posts 21. Posts 21 are embedded in the earth or a provided foundation at selected distances apart from each other. For a tracking system, a drive shaft 23 driven by a drive unit 25 extends perpendicular to rows 13 and engages each support tube 17 to cause pivotal rotation of each support tube 17. Drive shaft 23 may rotate or may move linearly. Drive shaft 23 is illustrated as engaging support tubes 17 midway along the lengths of each row 13. Each support tube 17, may for example be 200 feet in length or more, and posts 21 may be about 18 feet apart from each other.

Figure 2:
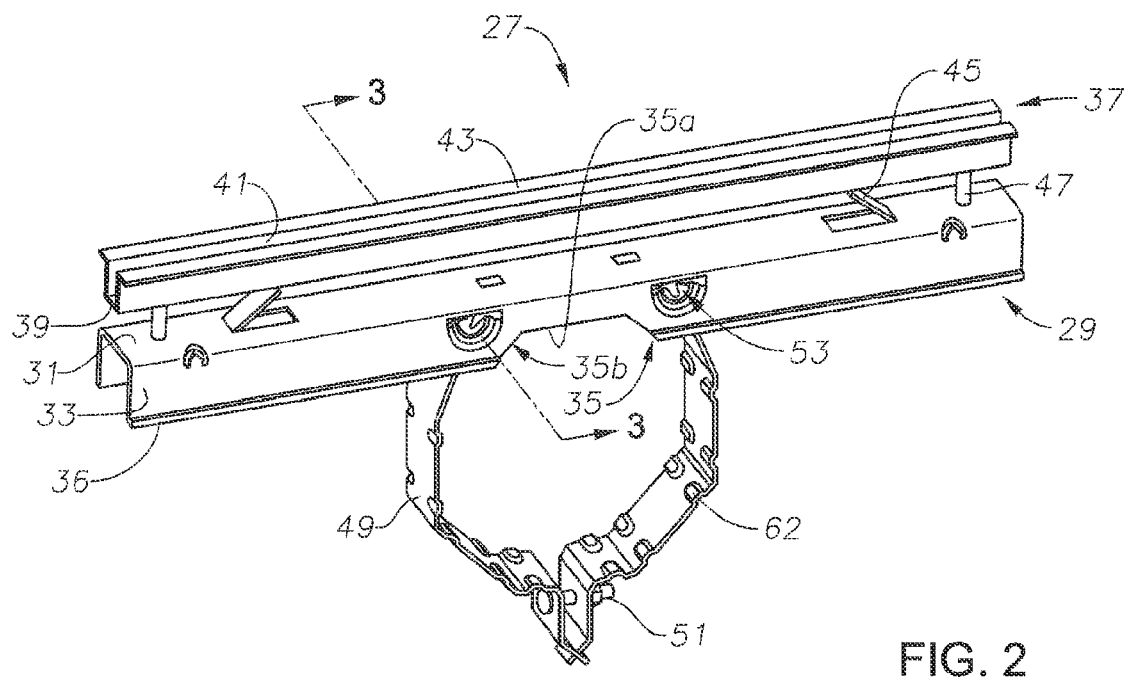
FIG. 2 is a perspective view of one of the clamps of FIG. 1.

Clamps 27 clamp each solar panel 15 to one of the support tubes 17. Clamps 27 may be employed not only with support tubes 17 that automatically rotate, but with support tubes that are manually rotated from one climate season to another, and also with fixed, non rotating support tubes. As shown in FIG. 2, each clamp 27 has a lower brace 29, which is a straight structural member. In this embodiment, lower brace 29 has a generally U-shaped transverse cross-sectional configuration, with a central, flat base or web 31 and two side walls 33 depending downward from web 31. The terms "upper", "lower", "vertical", "horizontal" and the like are used only for convenience as during operation, clamp 27 will tilt if support tube 17 (FIG. 1) rotatably pivots. Side walls 33 are flat, parallel to each other and perpendicular to web 31. An external lip 36 optionally extends along a length of lower brace 29 on the lower edge of each side wall 33.

Each side wall 33 has a cut out or recess 35 formed therein with a contour that mates with the contour of support tube 17 (FIG. 1). In the embodiment shown, each recess 35 has a flat upper edge 35a that is parallel with and spaced below web 31. Each recess 35 has two side edges 35b that extend downward from upper edge 35a to the lower edge of each side wall 33. In this example, side edges 35b are straight and incline downward and away from each other. The recesses 35 in side walls 33 are aligned with each other so that a centerline extending through each recess 35 between its side edges 35 will be perpendicular to the length of lower brace 29.

Lower brace 29 carries an upper brace 37, which is a straight structural member parallel with lower brace 29. Upper brace 37 may have the same length as lower brace 29. Upper brace 37 may also be U-shaped, but in this embodiment, it is inverted from lower brace 29. Upper brace 37 has a central flat, lower web 39 with two side walls 41 extending upward from each edge of web 39. A flange 43 extends outward from the upper edge of each side wall 41 in opposite directions along the length of upper brace 37. In this embodiment, the width of upper brace 37 from the outer edge of one flange 43 to the other is approximately the same width as lower brace 29 from lip 36 to lip 36. Upper brace web 39 is thus narrower than lower brace web 31.

At least one, and preferably two standoff members, tabs or flaps 45 are located between lower brace 29 and upper brace 37 to position upper brace 37 in an upper position initially relative to lower brace 29. In this example, each standoff flap 45 is a rectangular cut out punched upward from web 31 of lower brace 29. One edge of each standoff flap 45 is integrally joined to lower brace web 31. Each standoff flap 45 inclines upward similar to a ramp and has a free upper edge that contacts web 39 of upper brace 37 to support upper brace 37 above lower brace 29. Each standoff flap 45 has a width approximately the same as the width of upper brace web 39. A pair of bolts 47 extend between lower brace web 31 and upper brace web 39 to draw upper brace 37 downward when tightened. Standoff flaps 45 incline toward each other and are deflectable so as to fold down and allow upper brace 37 to move downward relative to lower brace 29. The deflection may be elastic or permanent. Alternately, standoff flaps 45 could be formed in upper brace 37. Also, coil springs (not shown) encircling bolts 47 between lower brace web 31 and upper brace web 39 could serve as standoff members rather than standoff flaps 45.

A retainer comprising first and second straps 49 connects with lower brace 29 for securing lower brace 29 to one of the support tubes 17 (FIG. 1). A fastener 51 secures straps 49 to each other at a point below support tube 17. Straps 49 are preferably formed of a metal that is compatible with the metal of support tube 17.

Referring to FIG. 3, first and second sets of support shoulders 53 are formed in lower brace 29. Each strap 49 releasably connects to lower brace 29 by engaging one of the set of support shoulders 53. Each support shoulder 53 is located on the inner side of one of the lower brace side walls 31. In the example shown, each support shoulder 53 is integrally formed with one of the side walls 31 by a machine tool punching inwardly on the exterior of side wall 31. An aperture 55 may be located above each support shoulder 53. The upper edge of each support shoulder 53 is located a short distance below lower brace web 31. The support shoulders 53 within each set are spaced across from each other, one on each side wall 33. A line passing through the center of each support shoulder 53 of one set is perpendicular to the length of lower brace 29. The two sets of support shoulders 53 are spaced apart from each other along the length of lower brace 29.

Each strap 49 has an upper end 57 that may be flat or slightly curved as shown. A center point of strap upper end 57 may touch or be spaced slightly below lower brace web 31 after installation. An outward extending tab 59 extends outward from each side edge of strap 49 at upper end 57 in opposite directions, creating hook-like members. Tabs 59 engage the upper ends of support shoulders 53 to retain straps 49 with lower brace 29. A recess 61 is formed in each side edge of strap 49 immediately below tabs 59. Recesses 61 have a length sufficient to clear the inward protruding support shoulders 53. The width of each strap 49 measured from the outer edge of one tab 59 to the other is slightly less than the width of lower brace 29 measured from an inner side of one side wall 33 to the other. The width of each strap 49 from one recess 61 to the other is less than the distance from the inner side of one support shoulder 53 to the other of the same set of support shoulders 53. The portion of strap 49 below recesses 61 may have the same width as at tabs 59.

Preferably each strap 49 has protuberances 62 spaced along its length for contacting the sides of support tube 17 (FIG. 4). In this example, protuberances 62 are integrally formed convex surfaces punched into each strap 49. Protuberances 62 are located at both side edges of strap 49, and the ones adjacent each other may be spaced a same distance from strap upper end 57. In this example, each protuberance 62 extends from one of the side edges a distance less than one-half the width of strap 49.

FIG. 4, which is a sectional view through lower brace web 31, shows an inside surface of one of the side walls 33. Each support shoulder 53 may have a downward extending slot 63 for receiving one of the strap tabs 59. Slots 63 of one support shoulder set may extend downward and slightly away from slots 63 of the other support shoulder set, as illustrated in FIG. 4. Alternately, slots 63 could be perpendicular to lower brace web 31.

A stop surface 65 is formed next to each set of support shoulders 53. Stop surface 65 may be formed by punching a small flat surface in web 31 and bending the flat portion downward. Each stop surface 65 is located between the support shoulders 53 of one of the sets. Each stop surface 65 may be in a plane parallel to a vertical plane 66 perpendicular or normal to lower brace web 31. Vertical plane 66 passes through a centerline or axis 67 of support tube 17. Vertical plane 66 is equidistant between each set of support shoulders 53. Each stop surface 65 is closer to vertical plane 66 than slots 63 of support shoulders 53.

The support tube 17 shown in FIGS. 4-8 has an octagonal configuration, but round, rectangular and other polygonal shapes are feasible. Support tube 17 has flat or planar surfaces 69, the upper portion of which fits closely in lower brace recesses 35. One of the flat surfaces 69, considered herein to be the upper surface 69a, will be spaced slightly below and parallel with each recess upper edge 35a. Two upper inclined surfaces 69b extend downward from upper surface 69a and away from each other at 45 degree angles. The length of recess upper edge 35 is slightly less than the width of support tube upper surface 69a, which causes the upper inclined surfaces 69b to be in flush contact with recess side edges 35b. The inclination of recess side edges 35b creates a wedging effect on support tube upper inclined surfaces 69b as lower brace 29 is placed on support tube 17, providing direct contact between recess side edges 35b and support tube upper inclined surfaces 69b. The close fit of recesses 35 over the inclined portions of support tube 17 assures that lower brace 29 will be aligned perpendicular to support tube axis 67. The support tube 17 shown also has two vertical side surfaces 69c that are parallel with vertical plane 66 and extend downward from upper inclined surfaces 69b. Two lower inclined surfaces 69d extend downward and toward each other from vertical side surfaces 69c. A bottom surface 69e joins lower inclined surfaces 69d and is parallel with upper surface 69a.

Figure 5:
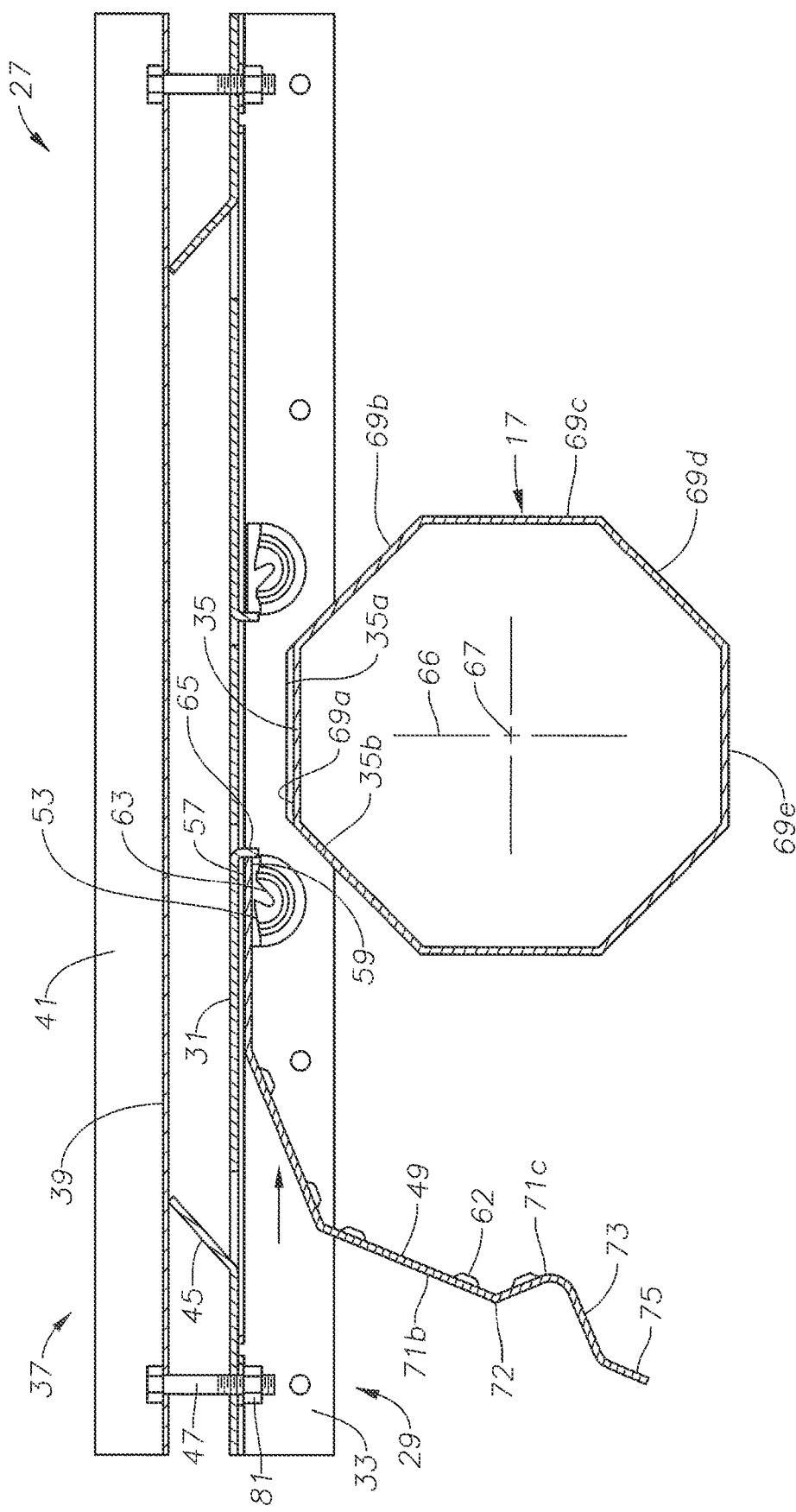
FIG. 5 is a sectional view similar to FIG. 4, but showing the strap being inserted farther into engagement with the lower brace of the clamp.
Figure 6:
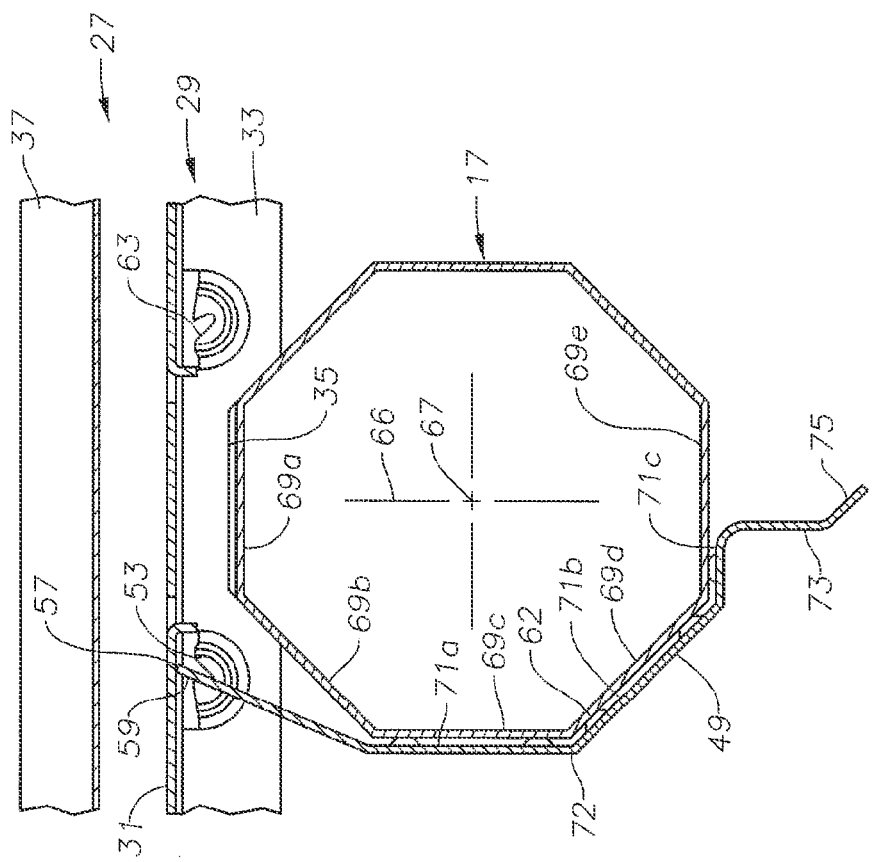
FIG. 6 is a sectional view similar to FIG. 5, but showing the upper end of the strap in full engagement with the lower brace.

FIGS. 4-6 illustrate a sequence of installing each strap 49. A worker will insert strap upper end 57 between side walls 33 and place strap upper end 57 into contact with the lower side of web 31, as shown by the arrow. Strap upper end 57 will be initially inclined toward vertical plane 66 and located outboard from support shoulder 53 relative to vertical plane 66. As shown by the arrow in FIG. 5, the worker continues to push strap upper end 57 toward vertical plane 66 and may rotate strap 49 slightly in a clockwise direction from its position in FIG. 4. The upper portion of strap 49 becomes generally horizontal, parallel with lower brace web 31. Upper end 57 will eventually contact stop surface 65, which provides an indication to the worker that upper end tabs 59 are properly above support shoulders 53. The worker than rotates strap 49 counterclockwise an increment of one rotation, as illustrated in FIG. 6, which places tabs 59 in slots 63.

Referring still to FIGS. 4-8, each strap 49 has a plurality of flat sections 71 joined to each other by integral corners or fold lines 72. The length of intermediate flat sections 71a and 71b is approximately the same as the dimension of support tube surfaces 69b and 69c. Preferably, each flat section 71 has two sets of protuberances 62, each set located near one of the fold lines 72. The lower portion of strap 49 has a flat bottom section 71c that has a length about half that of the other flat sections 71a, 71b. Only a single set of protuberances 62 are formed in flat bottom section 71c in this embodiment. Prior to installation, flat sections 71a, 71b and 71c may be permanently bent at angles along fold lines 72 that match the angles of support tube flat surfaces 69c, 69d and 69e. A planar fastener section 73 depends from bottom section 71c. An inclined lower end section 75 joins fastener section 73 and inclines toward vertical plane 66 passing through support tube axis 67.

Figure 7:
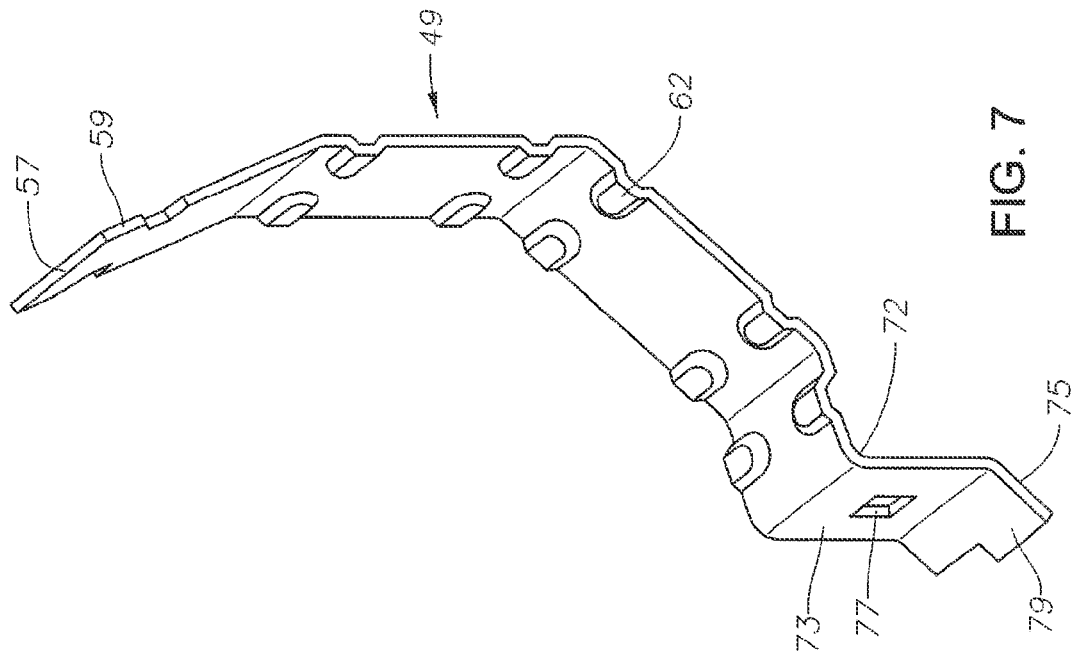
FIG. 7 is a perspective view of the strap of FIGS. 2-6, shown detached from the lower brace.

A fastener hole 77, preferably square, is located in fastener section 73, as shown in FIG. 7. Also, as also shown in FIG. 7, a lip 79 extends downward from a free end of inclined lower end section 75. Lip 79 is in the same plane as inclined lower end section 75, but has a width less than one-half the width of lower section 75, measured from one side edge to the other. Lip 79 provides a stepped appearance to the free end of lower end section 75. When straps 49 face each other, lip 79 on one strap 49 will extend from an opposite side edge of lip 79 on the other strap 49.

Referring to FIG. 6 again, after strap tabs 59 are nested in slots 63, gravity may cause strap 49 to be suspended generally as shown. The mating strap 49 (not shown in FIGS. 4-6) is installed in the same manner. The worker inserts the bolt of fastener 51 through holes 77 in fastener sections 73 and tightens the nut. Lips 79 will be juxtaposed and side-by-side, with each contacting the lower free end of the mating strap 49. When fastener 51 is properly tightened, strap fasteners sections 73 will be spaced apart from each other, as shown in FIG. 8, parallel to and on each side of vertical plane 66. Strap flat section 71a will be parallel with and spaced slightly from support tube vertical surface 69c. Strap flat section 71b will be parallel and spaced slightly from support tube inclined surface 69d. Strap flat section 71c will be spaced closely to support tube bottom surface 69e. Protuberances 62 of these flat sections 71a, 71b and 71c will be in contact with support tube flat surfaces 69c, 69d and 69e.

Figure 9:
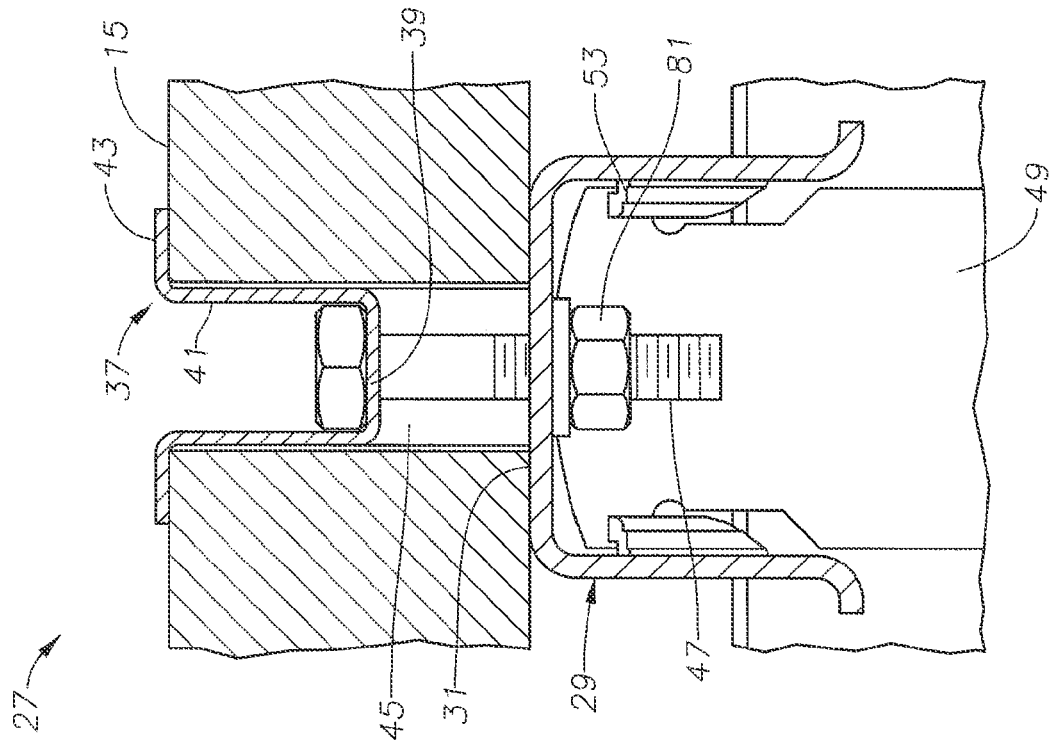
FIG. 9 is an end view of the clamp illustrated in FIG. 8, and showing portions of two panels placed on the lower brace and prior to tightening the upper brace of the clamp.

Referring to FIG. 9, prior to and while lower brace 29 is being secured, upper brace 37 will be in its upper position, being held in that position by standoff flaps 45 and bolts 47. In the upper position, the distance from lower brace web 31 to upper brace flanges 43 is greater than the thickness of the edges of the frames of solar panels 15. This greater dimension allows the workers to position the edge of each solar panel 15 between lower brace web 31 and upper brace flange 43. This positioning can occur by sliding lower brace 29 along support tube 17 before securing lower brace 29 to support tube 17. Alternately, unless the opposite edge of solar panel 17 is already clamped between another lower brace 29 and upper brace 37, solar panel 15 could be slid between lower brace web 31 and upper brace flange 43 after lower brace 29 has been fixed to support tube 17. Note that each clamp 27 can secure the side edges of adjacent solar panels 15, as shown, because flanges 43 extend in opposite directions.

Figure 10:
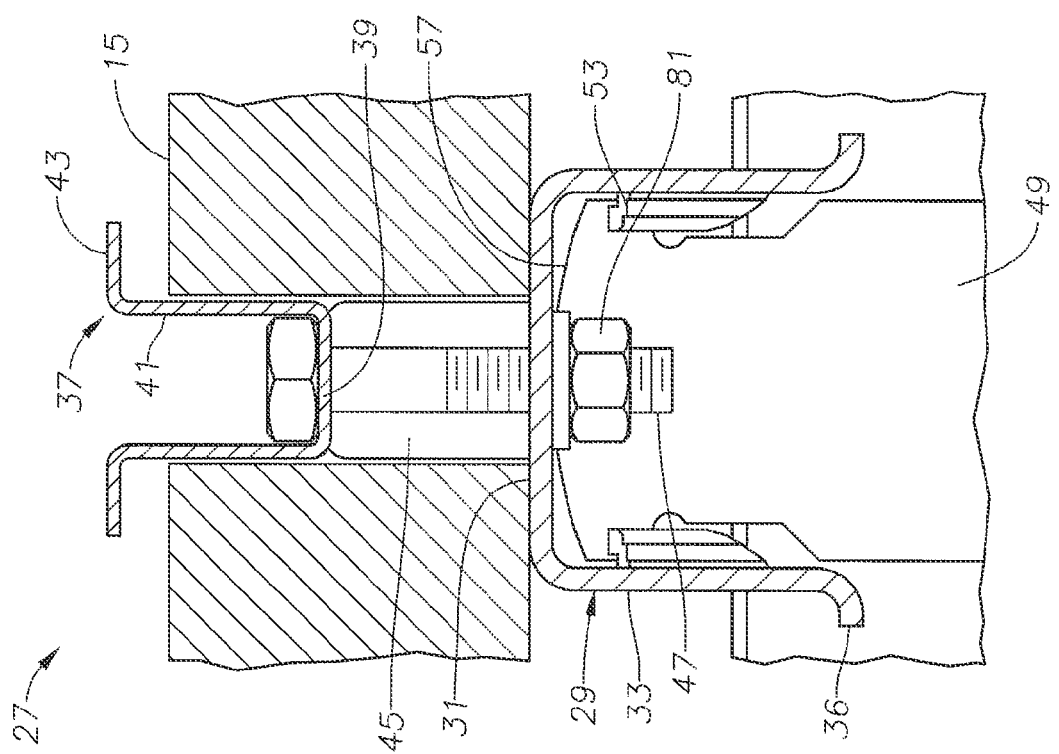
FIG. 10 is a view similar to FIG. 9, but showing the upper brace tightened against the panels.

After being positioned as shown in FIG. 9, a worker will tighten nut 81 on bolt 47, drawing flanges 43 down into contact with the adjacent edges of two solar panels 15, as shown in FIG. 10. The downward movement causes standoff flaps 45 to deflect or fold downward. Preferably nuts 81 will be pre-assembled with bolts 47 prior to installing clamp 27 on support tube 17. Two workers can readily install panels 15 because of the initial upper position of upper brace 37. One worker can hold panel 15 with an edge between upper and lower braces 37, 29 while the other worker tightens nuts 81.

Figure 11:
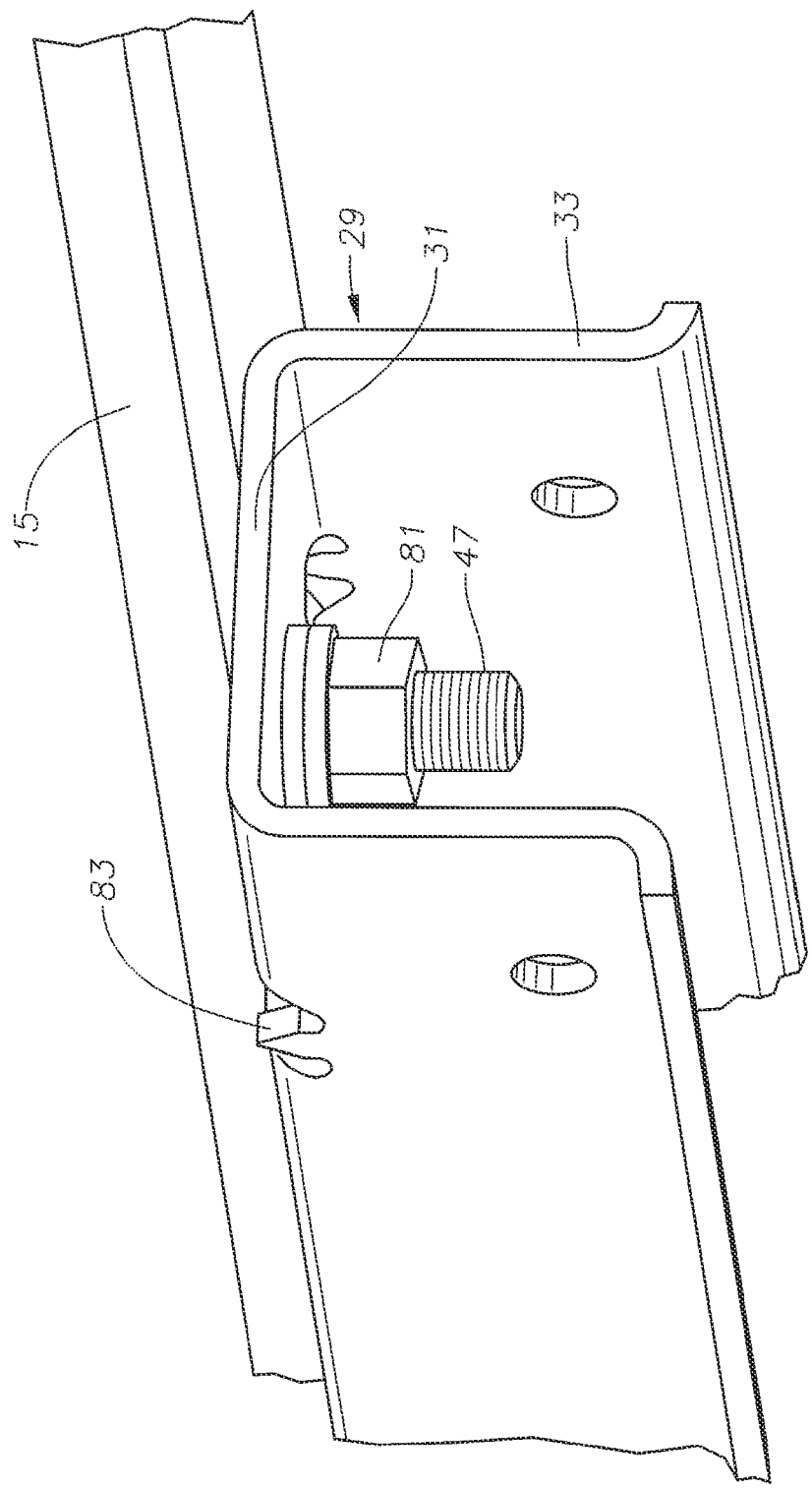
FIG. 11 is a perspective view of the lower brace, illustrating a grounding tooth embedding into one of the panels.

Referring to FIG. 11, a grounding tooth 83 may be integrally formed in lower brace 29. Grounding tooth 83 is illustrated as being integrally formed at a corner between one of the side walls 33 and web 31. The downward movement of upper brace 37 (FIG. 10), causes tooth 83 to bite and embed into the metal of the frame of solar panel 15. Grounding tooth 83 places the frame of solar panel 15 in electrical common with lower brace 29. Lower brace 29 is in electrical common with support tube 17 (FIG. 8) because of the metal-to-metal engagement of strap protuberances 62 with support tube 17.

While the disclosure has been shown in only one of its forms, it should be apparent that various modifications are possible. For example, the upper edges of the recesses in the side walls of the lower brace need not be flat. Also, the inclined side edges of the recesses could join each other at the upper end, providing a triangular configuration for each recess. The lower brace could be secured with a fold line of the support tube at the upper most side, and the inclined side edges of the recesses in flush contact with inclined upper sides of the support tube. If the support tube is square, the corner between two of the flat sides could located at the upper ends of the recesses, and the recess inclined side edges would be in flush contact with two of the flat sides of the square support tube.

Also, rather than forming the support shoulders on the inner sides of the lower brace side walls, they could be located in apertures in each side wall. The support shoulder would thus be the same distance apart from each other as the distance between inner surfaces of the side walls of the lower brace. In that event, the width of each strap, measured across the tabs, would be greater than the distance between the lower brace side walls. A worker would rotate the strap about an axis of the upper portion of the strap in order to insert the upper end of the strap between the lower brace side walls.

The invention claimed is:

1. A clamp for securing photovoltaic panels to a support tube of a photovoltaic panel array, comprising:
   a lower brace for positioning on the support tube perpendicular to the support tube, the lower brace having a central web with a pair of side walls depending from opposite edges of the web;
   first and second, sets of support shoulders in the side walls spaced apart from each other along a length of the lower brace, the support shoulders of each of the sets being opposite each other;
   first and second straps in engagement with the first and second sets of support shoulders, respectively, each of the straps having tabs on an upper end facing in opposite directions, each of the tabs of each of the straps landing on one of the support shoulders to retain each of the straps with the lower brace; and
   a fastener that secures lower ends of the straps to each other.

2. The clamp according to claim 1, wherein:
   a width of each of the straps between outer edges of the tabs is less than a distance between inner sides of the side walls.

3. The clamp according to claim 1, wherein:
   each of the support shoulders is located inward from an inner side of one of the side walls.

4. The clamp according to claim 1, further comprising:
   first and second stop surfaces adjacent the first and second sets of support shoulders, respectively, each of the stop surfaces depending downward from a lower side of the web; and wherein
   each of the stop surfaces is positioned for contact by the upper end of one of the straps during insertion of the strap into engagement with the support shoulders.

5. The clamp according to claim 1, further comprising:
   a plurality of protuberances protruding inwardly from each of the straps for contact with the support tube.

6. The clamp according to claim 1, wherein the lower end of each of the straps comprises:
   a planar fastener section having an aperture through which the fastener extends, the fastener section being in a plane normal to the length of the lower brace;
   an inward inclined section depending from each of the fastener sections, each of the inclined sections having a lower free end; and wherein,
   the lower free ends abut each other and space the fastener sections apart from each other when the fastener is tightened.

7. The clamp according to claim 6, further comprising:
   a lip depending from the free ends, the lip being offset from a centerline between side edges of each of the straps, such that the lips are juxtaposed when the fastener secures the straps.

8. The clamp according to claim 1, further comprising:
   a recess in each of the side walls of the lower brace, the recess having two side edges inclining downward in opposite directions to a lower side of the lower brace for contacting inclined side surfaces of the support tube.

9. The clamp according to claim 1, further comprising:
   an upper brace parallel to and located above the lower brace, the upper brace having flanges extending in opposite directions from each other along a length of the upper brace for engaging upper edge surfaces of adjacent ones of the panels;
   at least one deflectable standoff that positions the upper brace a distance from the lower brace that is selected to be greater than a thickness of the adjacent ones of the panels;
   a pair of bolts extending vertically between the upper and lower braces; and wherein
   tightening the bolts deflects the standoff and draws the upper brace toward the lower brace to clamp the adjacent ones of the panels between the lower and upper braces.

10. The clamp according to claim 1, further comprising:
    an electrical ground tooth projecting upward from the lower brace for embedding into one of the panels.

11. A clamp for securing photovoltaic panels to a support tube of a photovoltaic panel array, comprising:
    a lower brace for positioning on the support tube perpendicular to the support tube;
    a retainer that secures to the lower brace for looping around the support tube to retain the lower brace on the support tube;
    an upper brace located above and parallel with the lower brace, the upper brace having flanges facing in opposite directions along a length of the upper brace for overlying and engaging an upper edge surface of adjacent ones of the panels;
    at least one deflectable standoff between the lower brace and the upper brace that initially positions the upper brace a distance above the lower brace that is selected to be greater than a thickness of adjacent ones of the panel;
    a pair of bolts extending vertically between the upper and lower braces; and wherein
    tightening the bolts deflects the standoff and draws the upper brace toward the lower brace to clamp the adjacent ones of the panels between the lower and upper braces.

12. The clamp according to claim 11, wherein the at least one standoff comprises:
    a pair of standoff flaps, each of the standoff flaps having one edge integrally formed with one of the braces, each of the standoff flaps inclining from said one of the braces; and wherein
    tightening the bolts bends each of the standoff flaps about said one edge.

13. The clamp according to claim 11, wherein the lower brace comprises:
- a central web with a pair of side walls depending from opposite edges of the web; and
- first and second sets of support shoulders in the side walls and spaced apart from each other along a length of the lower brace, the support shoulders of each of the sets being opposite each other; wherein the retainer comprises:
- first and second straps in engagement with the first and second sets of support shoulders, respectively, each of the straps having tabs on an upper end facing in opposite directions, each of the tabs of each of the straps landing on one of the support shoulders to retain each of the straps with the lower brace; and
- a fastener that secures lower ends of the straps to each other.

14. The clamp according to claim 13, wherein:
- a width of each of the straps between outer edges of the tabs is less than a distance between inner sides of the side walls; and
- each of the support shoulders is located inward from an inner side of each of the side walls.

15. The clamp according to claim 14, further comprising:
- first and second stop surfaces adjacent the first and second sets of support shoulders, respectively, each of the stop surfaces depending downward from a lower side of the web; and wherein
- each of the stop surfaces is positioned for contact by the upper end of one of the straps during insertion of the strap into engagement with the support shoulders.

16. A method of securing a photovoltaic panel to a support tube of a solar array, comprising:
- (a) providing a lower brace with a central web having a pair of side walls depending from opposite edges of the web, and two sets of support shoulders in the side walls, the support shoulders of each of the sets being opposite each other;
- (b) providing a pair of straps, each of the straps having tabs on an upper end facing in opposite directions;
- (c) placing the lower brace on the support tube with a length of the lower brace perpendicular to the support tube;
- (d) inserting each of the straps between the side walls and placing each of the tabs on one of the support shoulders; then
- (e) positioning the straps alongside opposite sides of the support tube, and fastening lower ends of the straps to each other below the support tube; and
- (f) placing a lower side of an edge of the photovoltaic panel on the lower brace and tightly securing an upper brace over an upper side of the edge of the photovoltaic panel.

17. The method according to claim 16, wherein;
- step (a) comprises providing a downward extending stop surface adjacent each of the support shoulders; and
- step (d) comprises sliding the upper end of each of the straps along a lower side of the web until contacting one of the stop surfaces; and
- step (e) comprises after contacting the stop surfaces, rotating the straps about the upper end to a generally vertical orientation.

18. The method according to claim 16, wherein step (f) comprises:
- providing at least one deflectable standoff on one of the braces, and with the standoff, positioning the upper brace a selected distance above the lower brace that is greater than a thickness of the photovoltaic panel;
- inserting the edge of the photovoltaic panel between the braces while the standoff maintains the upper brace at the selected distance; then
- moving the upper brace toward the lower brace and against the edge of the photovoltaic panel, thereby deflecting the standoff.

19. The method according to claim 16, wherein the support tube has downwardly extending side surfaces that incline in opposite directions from an upper surface of the support tube, and the method further comprises:
- in step (a), providing recesses in each of the side walls of the lower brace, each of the recesses having two downward inclined side edges that incline in opposite directions; and
- step (c) comprises placing the side edges of the recesses in contact with the side surfaces of the support tube.

20. The method according to claim 16, wherein:
- step (a) comprises providing an electrical ground tooth projecting upward from the lower brace; and
- step (f) comprises while securing the upper brace, embedding the tooth into the photovoltaic panel to electrically ground the photovoltaic panel to the lower brace.

* * * * *